Oct. 28, 1969  K. S. HINIKER  3,474,746
FLEXIBLE EXTENSION FOR CHEMICAL BAND SPREADER
Filed March 23, 1967  2 Sheets-Sheet 1
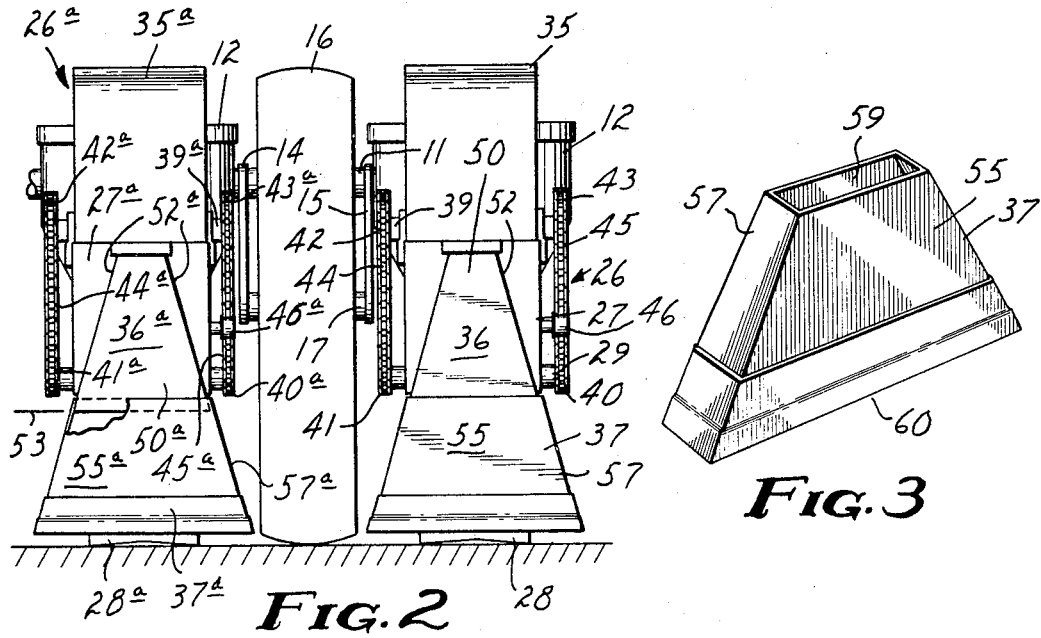
FIG. 2
FIG. 3
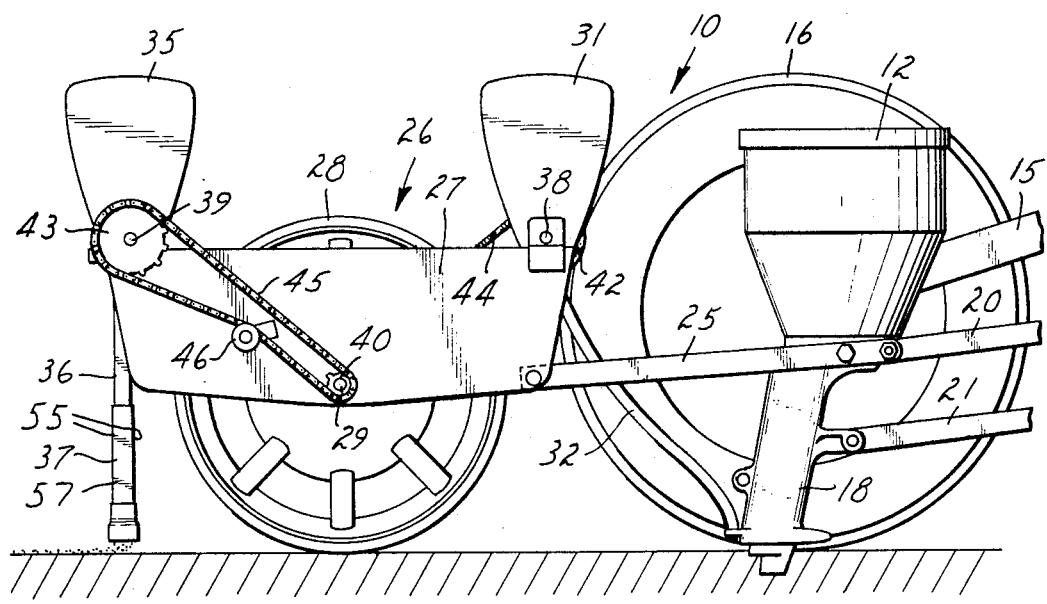
FIG. 1
INVENTOR.
KENNETH S. HINIKER
BY Merchant & Gould
ATTORNEYS United States Patent Office 3,474,746
Patented Oct. 28, 1969

3,474,746
FLEXIBLE EXTENSION FOR CHEMICAL BAND SPREADER
Kenneth S. Hiniker, Rte. 3, Mankato, Minn. 56001
Filed Mar. 23, 1967, Ser. No. 625,443
Int. Cl. A01c 5/04; B05b 1/28
U.S. Cl. 111—85                                    4 Claims

ABSTRACT OF THE DISCLOSURE

Apparatus for planting seed beneath the surface of the soil, depositing an insecticide over the planted seed, compacting the soil over the planted seed and insecticide, and then depositing a wide band of herbicide over the compacted soil. A flexible herbicide applicator conduit is attached beneath a more rigid conduit, and extends from the rigid conduit to a point closely adjacent the soil to protect the herbicide from the wind as it is discharged on the soil.

BACKGROUND OF THE INVENTION

Field of the invention

This invention relates generally to apparatus for planting and treating a seed bed and more particularly relates to an improved flexible applicator conduit that aids in accurately distributing a wide band of a granular material over the seed bed.

Description of the prior art

Apparatus for planting and treating seed beds has become quite sophisticated in recent years. It is now common practice to treat the soil with materials such as fertilizers, insecticides, and herbicides at the same time that the seed is planted. Typically, a single machine will perform all of the functions in a single trip over the soil. One type of planter that I am familiar with first applies a fertilizer to the cultivated soil. The seed is then planted a predetermined depth below the surface of the soil. A chemical insecticide is deposited in a narrow band above the planted seed and then a press wheel compacts the soil over the planted seed and insecticide. Finally, a herbicide attachment is provided that will spread a wide band of herbicide over the planted row to prevent the growth of weeds. Although the prior art shows apparatus for distributing herbicide in either a granular or liquid form, the present invention is directed only to those systems that distribute granular herbicide.

It is desirable that the granular herbicide be evenly distributed in a relatively wide band over the planted seed to assure that weeds do not choke out the desired crop. To achieve this type of distribution, the granular herbicide is normally discharged from a storage hopper through a fan-shaped applicator conduit, the outlet opening of which is positioned over the area of soil to be treated. The applicator conduit is usually equipped with baffles or deflector plates that cause the granular material to be evenly distributed across the entire width of the outlet opening. A granular material applicator of this type is shown in the Sosalla et al. Patent 3,074,727 that issued Jan. 22, 1963.

Prior art applicator devices of the type shown in the Sosalla et al. patent, generally do a good job of initially discharging the granular matetrial evenly across the width of the outlet opening. Theoretically, this granular material, if properly discharged from the applicator device, will fall by gravity to the surface of the soil to form a protective chemical band of the desired width. Practically speaking, however, such even distribution cannot be achieved if any wind at all is present. The applicator device, since it is constructed from a rigid material, and since it is rigidly mounted to the planter frame, cannot be positioned too close to the surface of the soil. The outlet opening of the applicator device is normally positioned approximately one foot above the surface of the soil so that no damage to it will occur because of accidental contact with the soil or any obstructions lying thereon. This damage could occur, for example, if the press wheel of the planter were to drop into a rut or hole in the soil. Protruding rocks might also cause damage to a rigid applicator device if it were positioned too close to the soil surface. For these reasons, on a windy day, it is almost impossible to achieve proper distribution with this type of applicator device.

SUMMARY OF THE INVENTION

The present invention is directed to a flexible applicator extension that is mounted beneath the rigid applicator conduit to protect the granular material from the wind as it falls to the ground. The outlet opening of the flexible extension is positioned closely adjacent the surface of the soil to provide maximum shielding, but yet is displaceable from its normal position upon contact with the soil or any obstructions lying thereon. In the preferred embodiment of my invention, the rigid conduit has a truncated triangular shape. The flexible applicator conduit of my invention also has a truncated triangular shape and is larger in dimensions than the rigid conduit so that it can be telescopically fitted over the rigid conduit for support thereby. The flexible conduit extension can therefore flex laterally or move vertically upon contact with an obstruction.

BRIEF DESCRIPTION OF THE DRAWINGS

FIGURE 1 is a fragmentary view, in side elevation, of apparatus for planting and treating a seed bed, having the flexible applicator extension of my invention mounted thereon;

FIGURE 2 is a fragmentary view in rear elevation as seen from the left with respect to FIGURE 1;

FIGURE 3 is a view in perspective of the flexible applicator extension of my invention;

DESCRIPTION OF THE PREFERRED EMBODIMENT

Figure 4:
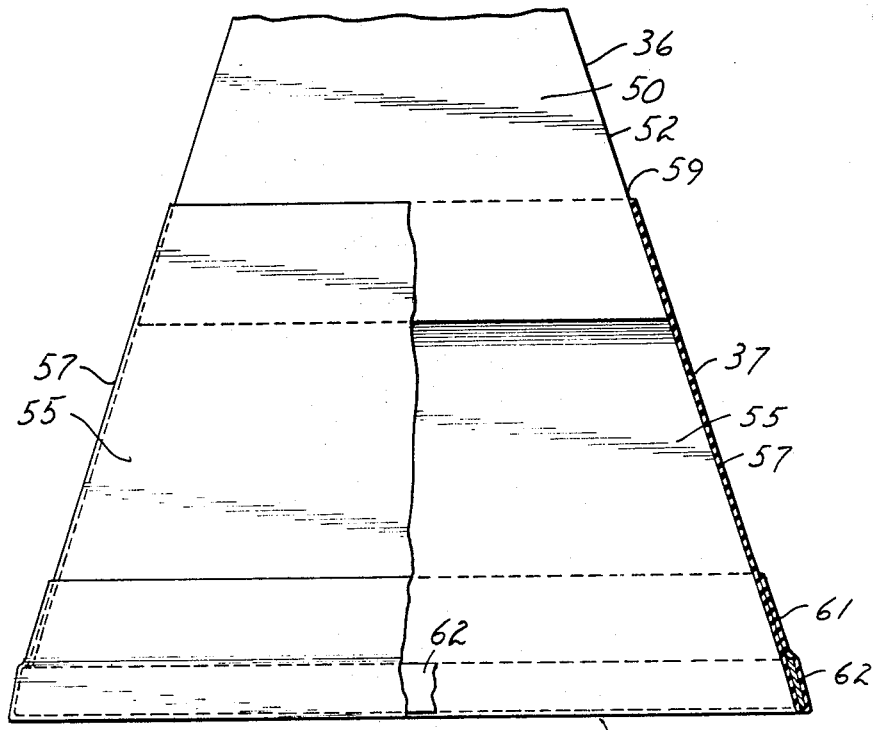
FIGURE 4 is an enlarged rear view of the flexible applicator extension of my invention, portions thereof being broken away and portions being shown in section.

Referring now to the drawings, wherein like reference numerals are used throughout the several views to identify like parts, there is disclosed an apparatus 10 for planting and treating a seed bed. Attached to the tractor's hydraulic control system, in a manner well-known in the art but not shown in the drawings, is a tubular transverse frame member 11 which controls the adjustment of apparatus 10. Frame member 11 is connected in the usual manner to a hollow planter shank member 18 by a bar 20 and a bar 21. Bars 20 and 21 are used to adjust the depth of and to stabilize planter shank member 18 in an upright position. Mounted on the top of shank member 18 is a seed hopper 12. A plurality of shank members 18 and hoppers 12 are provided, the number depending upon the number of rows to be planted, usually either four, six or eight. Welded or otherwise attached to frame member 11 are a pair of rearwardly and downwardly extending brackets 14 and 15 that straddle a large tractor-type tire 16. Tire 16, used for flotation of the apparatus 10, is provided with a rotatable axle 17, to the ends of which are rigidly attached brackets 14 and 15.

Hollow shank member 18 is secured to the bottom of seed hopper 12 and is adapted to deposit seed at a predetermined depth beneath the surface of the soil in a manner well known in the art.

Extending rearwardly from shank member 18 and bar 20 are a plurality of trailing arms 25 that are connected to and adapted to pull an earth treating apparatus 26. Since a separate earth treating apparatus 26 is provided for each row to be planted, as shown in FIGURE 2, a description of a single earth treating apparatus 26 will suffice, and the identical elements of the other apparatus will be identified by the same numeral together with the letter a.

Referring now to FIGURE 1, earth treating apparatus 26 includes a support frame 27 carried by a press wheel 28. An axle 29 extends through both press wheel 28 and support frame 27. Axle 29 is rigidly secured to press wheel 28 and rotates therewith, but is rotatable with respect to support frame 27.

Mounted on the top of support frame 27, at the forward end thereof, is an insecticide hopper 31 having a discharge hose 32 extending downwardly therefrom. The bottom end of hose 32 is connected to shank 18 just above the surface of the soil, and at the trailing edge thereof. Also mounted on the top of support frame 27, at the rear end thereof, is a herbicide hopper 35 having a downwardly extending applicator device 36. Attached to the bottom of applicator device 36 is the flexible applicator extension 37 of my invention.

Discharge means are attached to hopper 31 for continually discharging the insecticide material therein during normal planter operation. A drive shaft 38 extends through the bottom portion of hopper 31 to provide motive power for the discharge means. A similar discharge means is provided for hopper 35 for continually discharging the granular herbicide therefrom during normal planter operation. A drive shaft 39, extending through the bottom portion of hopper 35, provides motive power for the discharge means.

Attached to opposite ends of axle 29 are a pair of drive gears 40 and 41. Mounted on drive shaft 38, on the same side of support frame 27 as drive gear 41, is a driven gear 42. Connected between drive gear 41 and driven gear 42 is an endless chain 44. Mounted on drive shaft 39, on the same side of frame 27 as drive gear 40, is a driven gear 43. Connected between drive gear 40 and driven gear 43 is an endless chain 45. A movable roller 46 is provided on frame 27 to take up the slack in chain 45. Thus, the rotation of press wheel 28 during normal planter operation, is transferred to drive shafts 38 and 39 by means of endless chains 44 and 45. The rotation of shaft 38 causes the discharge of material carried by hopper 31 while rotation of shaft 39 causes the discharge of material carried by hopper 35.

Applicator device 36 is attached to the discharge means of hopper 35 and is adapted to direct the distribution of the granular herbicide material over a predetermined area of soil. Applicator device 36 is a rigid structure, normally constructed from metal, and has a truncated triangular shape with a pair of generally parallel end walls 50, and a pair of downwardly diverging side walls 52. A rectangular inlet opening is thus formed in the upper end of applicator device 36 and is positioned to receive the herbicide material discharged from hopper 35. A larger rectangular material outlet opening is formed in the lower end of applicator device 36. The material outlet opening is positioned a predetermined distance above the soil, as indicated by line 53 in FIGURE 2, to prevent contact between rigid applicator device 36 and the soil during normal planter operation. In commercially available planters, this predetermined distance above the soil is on the order of one foot.

Although not shown herein, since they do not form a part of my invention, applicator device 36 would normally be provided with interior baffles designed to spread out the material being discharged from hopper 35. Thus, the granular material is discharged evenly across the full width of the outlet opening in applicator device 36. The material then falls by gravity to form a wide band across the planted row, as best shown in FIGURE 2. Since the outlet opening of applicator device 36 is positioned approximately one foot above the surface of the soil, the material being discharged therefrom is subject to being affected by the wind as it falls to the ground. On a windy day, it is possible for most of the material to be blown away before ever reaching the ground. Since the herbicide material must be placed over the planted row to be effective, any material carried away by the wind is wasted.

In order to avoid this waste of material, and at the same time avoid damage caused by contact with the ground, I have designed the flexible applicator extension 37 shown herein. Applicator extension 37 is formed from a flexible material such as a rubberized cloth, and it also has a truncated triangular shape with a pair of generally parallel end walls 55 and a pair of downwardly diverging side walls 57. End walls 55 and side walls 57 define an upper or inlet opening 59 of a size intermediate the size of the openings in applicator device 36. End walls 55 and side walls 57 also define a material outlet opening 60 that is greater in size than any of the other three openings previously described.

Side walls 57 of applicator extension 37 are slightly wider than side walls 52 of applicator device 36. This permits applicator extension 37 to be telescopically fitted over applicator device 36 for support thereby, as most clearly shown in FIGURE 4. Since the inlet opening 59 of extension 37 is smaller than the outlet opening of applicator device 36, and since the side walls of each device diverge outwardly at the same angle, extension 37 can be dropped over applicator device 36 and will be supported thereby without the aid of any further fastening means. The amount of overlap between devices 36 and 37 can of course be varied by varying the size of inlet opening 59. Since no fastening means are required between devices 36 and 37, extension 37 is free to move vertically with respect to applicator device 36.

Since applicator extension 37 is constructed from a flexible material, it is desirable to provide means for holding the bottom edge thereof in a desired configuration. The particular means I have employed is best shown in FIGURE 4. End walls 55 and side walls 57 are initially cut to a length greater than that finally desired. The excess material adjacent the bottom edge or outlet opening 60 is folded outwardly and upwardly to form a seam 61 of double thickness. A rectangular metal band 62 is mounted within the seam 61 adjacent the bottom edge of applicator extension 37. After the metal band 62 is inserted, the excess material is folded around it to form seam 61. The excess material forming seam 61 is secured to walls 55 and 57 by a suitable adhesive. Other well known fastening methods could be utilized without departing from the invention. Once seam 61 is formed with metal band 62 sealed therein, outlet opening 60 will be held in the desired rectangular configuration.

Figure 5:
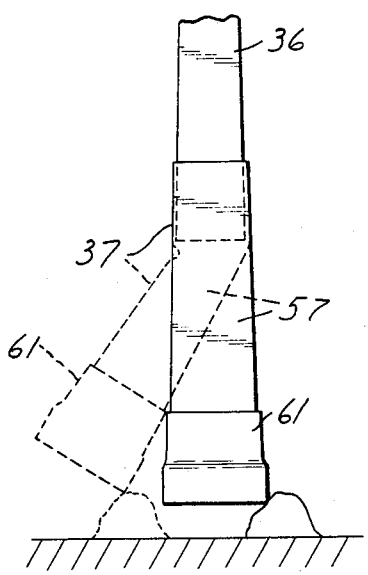
FIGURE 5 is a side view, as seen from the right side of FIG. 4 on a reduced scale, of the flexible applicator extension, the normal position thereof being shown in full lines and an abnormal obstruction clearing position being shown in phantom.
Figure 6:
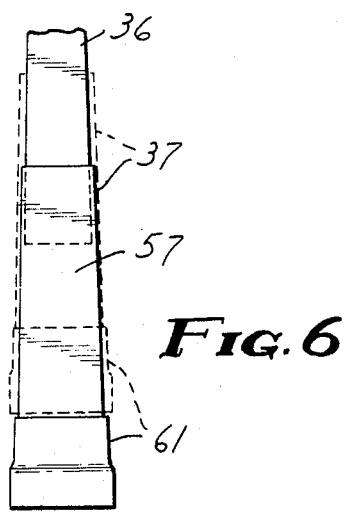
FIGURE 6 is a side view similar to FIG. 5 showing vertical movement of the flexible applicator extension, the normal position thereof being shown in full lines and an abnormal obstruction clearing position being shown in phantom.

Outlet opening 60 of flexible applicator extension 37 is positioned closely adjacent the surface of the soil during normal planter operation to prevent the granular herbicide material from being affected by the wind, or otherwise scattered from the area of soil to be treated. As best shown in FIGURES 5 and 6, the telescopically mounted, flexible applicator extension 37 is adapted to either flex laterally or move vertically upon contact with the soil or with any obstructions lying thereon. Thus, the herbicide material is protected from the wind during almost its entire drop to the surface of the ground, but no damage to the prior will occur if press wheel should drop into an opening or rut in the ground.

While I have shown and described a single embodiment of my invention, it will be understood that those skilled in the art may be capable of modifying it without departing from the spirit and scope of the invention.

I claim:

1. In combination with a seed planter having means for depositing seed beneath the surface of the soil and means for compacting the soil over the planted seed; means for depositing a wide band of herbicide over the surface of the compacted soil comprising:
    (a) a hopper mounted on said planter for storing a granular herbicide material, said hopper having discharge means for continually discharging said granular herbicide material during the planter operation;
    (b) means attached to said hopper for directing the distribution of said granular herbicides material over a predetermined area of said soil, including:
        (1) a rigid applicator device attached to said hopper having a truncated triangular shape with generally parallel end walls and downwardly diverging side walls forming a material inlet opening positional to receive said material from said discharge means, and a larger material outlet opening positioned a predetermined distance above said soil, said predetermined distance being sufficiently great to prevent contact between said rigid applicator device and said soil during normal planter operation; and
        (2) an applicator extension formed from a flexible material and having a truncated triangular shape with generally parallel end walls and downwardly diverging side walls, said side walls being slightly wider than said side walls of said rigid applicator device, said applicator extension having an inlet opening of a size intermediate the size of said openings in said rigid applicator device and an outlet opening greater in size than said other openings, said extension being telescopically fitted over said rigid applicator device for support thereby, said outlet opening of said extension being positioned closely adjacent the surface of said soil during normal planter operation to prevent said granular herbicide material from being affected by wind or otherwise scattered from the predetermined area of soil to be treated, said telescopically mounted, flexible application extension thereby being adapted to either flex laterally or move vertically upon contact with said soil or any obstructions lying thereon.

2. The apparatus of claim 1 wherein said flexible material forming said applicator extension comprises a rubberized cloth, and wherein a rectangular metal band is attached to said walls of said flexible applicator extension adjacent said outlet opening.

3. An extension device for mounting on a mechanized soil working apparatus having means for automatically and continually discharging a granular material through an outlet opening of a rigid applicator conduit having a generally truncated triangular shape with generally parallel end walls and downwardly diverging side walls and terminating a sufficient distance above the soil to prevent contact therewith during normal operation, comprising:
    (a) an applicator conduit constructed from a flexible material and having a truncated triangular shape with generally parallel end walls and downwardly diverging side walls of predetermined lengths;
    (b) said flexible applicator conduit having a material inlet opening and a larger material outlet opening formed at opposite ends of said walls, said inlet opening being smaller than the outlet opening of the rigid conduit; and
    (c) said flexible applicator conduit being telescopically mounted on the lower end of said rigid conduit for support thereby, said predetermined length being such that said outlet opening is positioned closely adjacent the surface of the soil to shield the granular material from the wind, said telescopically mounted, flexible applicator conduit thereby being displacable from its normal position to either flex laterally or move vertically upon contact with the soil or any obstructions lying thereon to prevent damage thereto.

4. The apparatus of claim 3 wherein a metal support band is attached to said walls of said flexible applicator conduit adjacent said outlet opening.

References Cited

UNITED STATES PATENTS

| 1,220,249 | 3/1917 | McWhorter | 222—527 |
| 2,990,186 | 6/1961 | Gandrud | 239—660 |
| 3,129,844 | 4/1964 | Madison | 222—176 X |

ROBERT E. BAGWILL, Primary Examiner

S. C. PELLEGRINO, Assistant Examiner

U.S. Cl. X.R.

222—177, 461, 527; 239—594, 602; 302—63